July 10, 1923.
R. G. BRUNER
WHEEL
Filed March 23, 1922      2 Sheets-Sheet 1
1,461,475
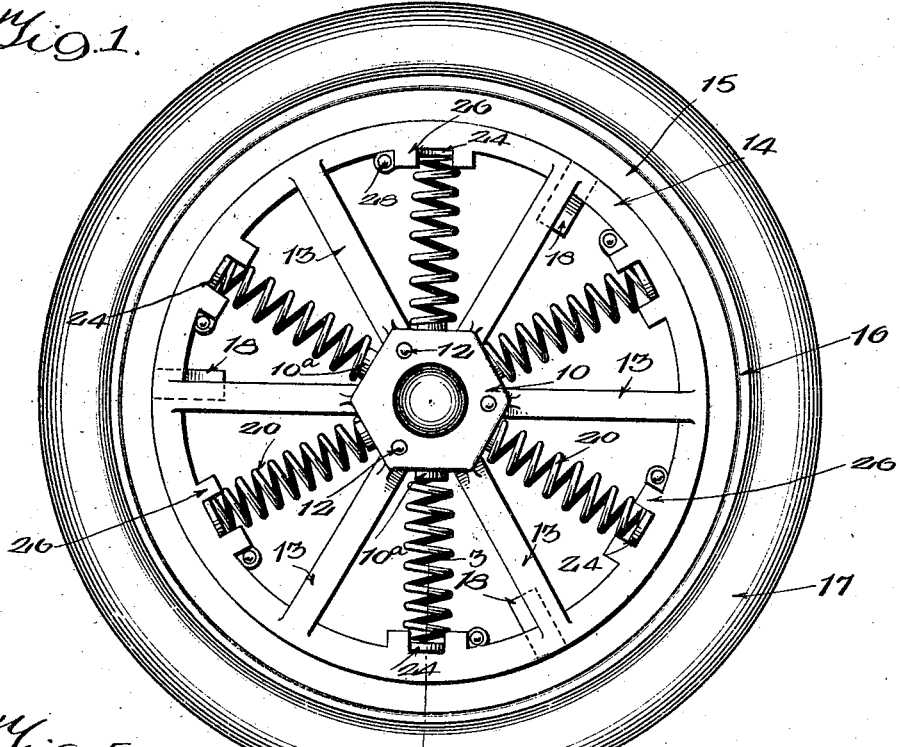
Fig.1.
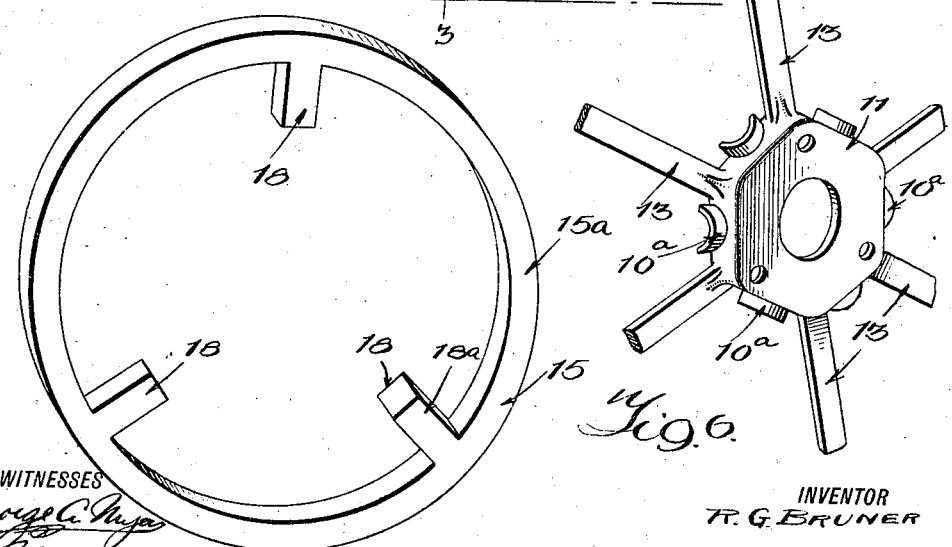
Fig.5.
Fig.6.
WITNESSES
INVENTOR
R. G. BRUNER
BY
ATTORNEYS July 10, 1923.
R. G. BRUNER
WHEEL
Filed March 23, 1922   2 Sheets-Sheet 2
1,461,475
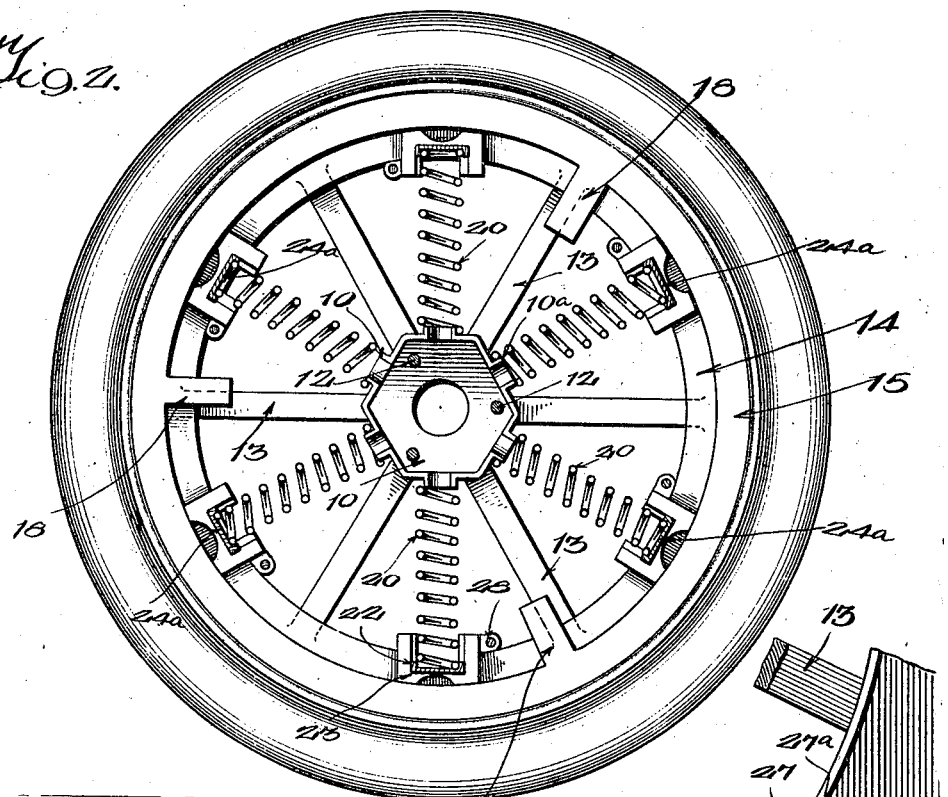
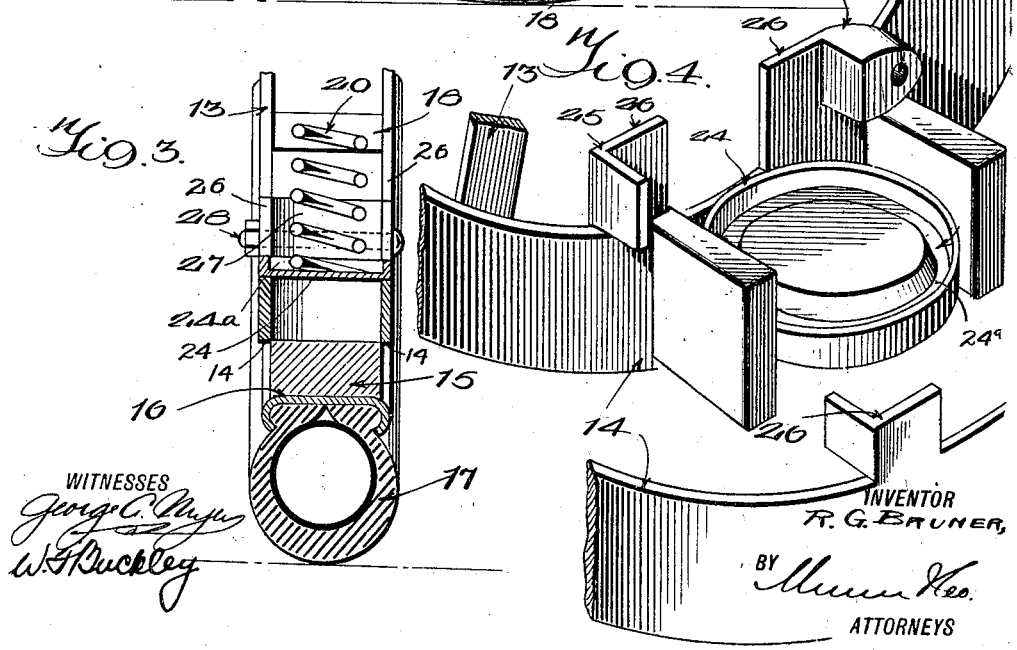

Patented July 10, 1923.

1,461,475

UNITED STATES PATENT OFFICE.

REUBEN GLADSTONE BRUNER, OF WINDSOR, ONTARIO, CANADA.

WHEEL.

Application filed March 23, 1922. Serial No. 545,973.

*To all whom it may concern:*

Be it known that I, REUBEN GLADSTONE BRUNER, a subject of the King of Great Britain, and a resident of Windsor, in the Province of Ontario and the Dominion of Canada, have invented certain new and useful Improvements in Wheels, of which the following is a specification.

The present invention relates to an improvement in wheels, and more particularly to spring or resilient wheels.

The object of the invention is to provide a wheel of this character which possesses relatively high cushioning capacity and which is at the same time highly efficient in operation in that the springs which are not under load at any given time do not increase the stresses imposed upon the springs under load or interfere with or impair the action of such springs in any way while at the same time being adapted to immediately come into action when moved into position to be subjected to load.

Another object is to provide a spring wheel of this character which is of extremely simple and durable construction, reliable and effective in operation and easy and comparatively inexpensive to manufacture.

Another object is to provide a spring wheel of this character wherein the parts are readily accessible for purposes of cleaning, replacement and repair.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 1 is a view in side elevation, illustrating the preferred embodiment of the invention;

Figure 2 is a sectional view, the section being taken in the median plane of the wheel and parts being shown in elevation for the sake of illustration;

Figure 3 is a view in transverse section on line 3—3 of Figure 1;

Figure 4 is a fragmentary perspective view, illustrating the component parts of a spring seat, parts being shown in position immediately prior to assembly;

Figure 5 is a detail perspective view of the outer ring or felly; and

Figure 6 is a fragmentary perspective view, illustrating one of the companion parts of the hub.

Referring to the drawings wherein for the sake of illustration is shown the preferred embodiment of the invention, the numeral 10 designates generally a hub which comprises a pair of companion parts, designated at 11 and shown in detail in Figure 6. The companion parts 11 of the hub are bolted together in assembly by means of bolts 12. A series of spokes 13 is carried by each of the companion parts 11 of the hub, and the arrangement is such that the spokes carried by one of the parts of the hub extend parallel and in confronting relation with respect to the spokes of the other companion part. These spokes 13 are rigidly secured to or integrally formed with their respective parts of the hub 11 at their inner ends and at their outer ends the spokes of each series have integrally formed therewith or rigidly secured thereto a ring or annular plate 14. As there are two series of spokes 13 so there are two rings or annular plates 14 and these rings or annular plates are, like the spokes, arranged parallel and in spaced confronting relation. It is obvious that the spokes and rings together constitute, in a broad sense, the body of the wheel.

A loose or sliding felly 15 is provided, and has suitably secured to its outer periphery a rim 16 upon which the tire designated at 17 is mounted. The sliding felly 15 has its lateral faces 15$^a$ smooth and flat and this felly is also provided with a series, preferably three, inwardly and radially extending guide posts or bars 18, the guide posts or bars being rigidly secured or integrally formed with the felly. The guide posts 18 extend in between the spaced rings 14 carried at the outer ends of the spokes 13 and have sliding engagement with the inner faces of these rings. As the guide posts 18 are of the same width as the felly and as the lateral faces 18$^a$ of the guide posts are coincident with the lateral faces 15$^a$ of the felly these guide posts serve to guide the rings into sliding engagement with the lateral faces of the felly in certain phases of the operation, as will be hereinafter more fully described.

A plurality of radially extending compression coil springs 20 is provided, and these springs abut the hub 10 at their inner ends and coact at their outer ends with spring seats or stands, to be hereinafter more fully described.

The inner ends of the springs 20 are held in proper abutting relation with respect to the hub 10 by means of collars 10ª formed upon the hub 10 and extending into the spring. The collars 10ª have a sufficient extent to preclude displacement of the springs 20 in any phase of the operation and preferably these collars each comprise half sections formed upon the companion parts 11 of the hub, as shown in Figure 6.

The spring seat or stand which is provided for each spring 20 coacts with the outer end of its spring and comprises a sliding support or carrier 22 having lugs 23 engageable with the inner peripheral face of the felly 15 in certain phases of the operation, and a bearing plate or cap plate 24 with which the outer end of the spring 20 engages, the bearing plate having an annular groove 24ª receiving the outermost convolution of the adjacent coil spring 20. The bearing plate is of a diameter slightly greater than the distance between the rings 14 so that it engages the inner circumferential edges of these rings 14 in certain phases of the operation. The sliding supports or carriers 20 operate in guides, designated generally at 25. Each guide 25 includes four angular guide bars 26, two of the angular guide bars 26 being arranged on the same ring 14 and being secured and integrally formed with said ring and the angular guide bars of one ring 14 being arranged in opposed and confronting relation with respect to the angular guide bars of the other ring 14. One set or pair of opposed angular guide bars are provided with relatively heavy lugs 27 having bolt holes 27ª therethrough through which bolts 28 extend to secure the guides as well as the rings together, and in proper relation with respect to each other. These lugs 27 also constitute stops or bumpers in that they are engageable with guide posts 18 to limit the relative circumferential movement between the hub, spokes and rings on the one hand and the loose felly, rim and tire on the other hand. It is obvious that while these posts 18 and lugs 27 are shown in slightly spaced relation they may be made to engage each other at all times if this is found desirable. Preferably, however, the arrangement is as shown.

When the wheel is assembled the springs 20 are under sufficient compression to hold the parts in their proper position and to prevent rattling or chattering. When however the wheel is applied to a vehicle the springs disposed in the lower half of the wheel take the load and the springs in the upper half of the wheel are not subjected to load. The springs which take the load are of course compressed and the compression of these springs results in the rings 14 being disposed in overlapping relation with respect to the sliding or loose felly 15 since the compression of these springs is brought about by relative movement as between the rings 14 and the felly 15. At this time the inner ends of the springs abut the hub 10 and the outer end of the springs abut the bearing plate 24 of the spring carriers but the bearing plates 24 of the spring carriers do not rest on the inner circumferential edges of the rings 14 as due to the relative movement between the rings 14 and the felly 15, the inner peripheral face of the felly 15 and the lugs 23 of the sliding support or carrier 22 have come into engagement and the carrier is now supported on the felly by the lugs and is not supported on the rings by the bearing plate. This is true however only with respect to the springs subjected to load and consequently compressed. In the upper half of the wheel where the springs are not subjected to load and consequently not compressed beyond the point necessary to prevent chattering or displacement of the parts, the springs 20 abut the hub at their inner ends and the bearing plates at their outer ends but the bearing plates engage the inner circumferential edges of the rings 14 so that the sliding supports or carriers are held in position by these rings 14, the lugs of the supports or carriers being at this time out of engagement with the inner peripheral face of the felly 15. This is a very important feature of the invention because by this arrangement the springs which are not subjected to load do not interfere with or impair the action of the springs which are subjected to load and they do not further increase or supplement the load of the spring. Moreover these springs not subjected to load are thus not subjected to wear as they are never stretched or compressed to any great degree. Yet at the same time they come instantly into action when brought into the field of load. In this manner the wheel possesses a high capacity for resiliency and properly cushions the vehicle with which it is associated and at the same time it is of extremely simple construction and its parts are readily accessible for purposes of replacement or repair. Again the parts of the wheel may be readily and completely housed by the attachment of disks to the sides of the wheel if this be desired.

I claim:

1. In a wheel of the character described, a hub, a wheel body organized with the hub, a felly movably mounted on the wheel body, compression coil spring having their inner ends engaged with the hub, and a seat for the outer end of each of said coil springs, each seat being supported upon said felly when the spring with which it is associated is subjected to load and being engaged with the wheel body when the spring with which it is associated is not subjected to load.

2. In a wheel of the character described, a hub, spokes carried by said hub, rings carried at the outer ends of said spokes, said rings being disposed in spaced parallel relation, a felly slidably engaged with said rings, compression coil springs having their inner ends engaged with the hub and a seat for the outer end of each of said coil springs, said seat being supported upon said felly when the spring with which it is associated is subjected to load and being supported upon said rings when the spring with which it is associated is not subjected to load.

3. In a wheel of the character described, a hub, spokes carried by said hub, rings carried at the outer ends of said spokes, said rings being disposed in spaced parallel relation, a felly slidably engaged with said rings, a plurality of guide posts carried by the felly and operating between said rings, compression coil springs having their inner ends engaged with the hub and a seat for the outer end of each of said coil springs, said seat being supported upon said felly when the spring with which it is associated is subjected to load and being supported upon said rings when the spring with which it is associated is not subjected to load.

4. In a wheel of the character described, a hub, spokes carried by said hub, rings carried at the outer ends of said spokes, said rings being disposed in spaced parallel relation, a felly slidably engaged with said rings, means carried by the rings and cooperable with the guide posts for limiting relative circumferential movement between the rings and the felly, compression coil springs having their inner ends engaged with the hub and a seat for the outer ends of each of said coil springs, said seat being supported upon said felly when the spring with which it is associated is subjected to load and being supported upon said rings when the spring with which it is associated is not subjected to load.

5. In a wheel of the character described, a hub, spokes carried by said hub, rings carried at the outer ends of said spokes and arranged in spaced parallel relation, a felly operating between said rings, coil springs abutting the hub at their inner ends, and a spring seat for the outer end of each of said springs including a support having lugs engageable with the felly, and a bearing plate receiving the outer end of the spring and engageable with said rings, and guide means for said seat carried by said rings.

6. In a wheel of the character described, a hub, spokes carried by said hub, rings carried at the outer ends of said spokes and arranged in spaced parallel relation, a felly operating between said rings, coil springs abutting the hub at their inner ends, a spring seat for the outer ends of each of said springs including a support having lugs engageable with the felly, a bearing plate receiving the outer end of the spring and engageable with said rings, guide means for said seat carried by said rings, said guide means comprising a plurality of angular guide bars carried by the rings, said guide bars being arranged in opposed and confronting relation, certain of said guide bars having lugs provided thereon and provided with bolt holes, and bolts extending through said bolt holes for securing said angular guide bars in proper position.

7. In a wheel of the character described, a hub comprising companion parts, a series of spokes carried by each of the companion parts of said hub, the spokes of one series being arranged in spaced parallel and confronting relation with respect to the spokes of the other series, a ring carried at the outer ends of the spokes of each series, said rings being arranged in spaced parallel and confronting relation, a felly adapted to slidably operate between said rings, a plurality of inwardly extending radial guide posts carried by said felly and engaging said rings, and a plurality of compression coil springs abutting said hub at their inner ends, the hub having collars engaged with said springs for holding them against displacement, a spring seat for the outer end of each of said springs including a sliding support having lugs adapted to be engaged with the felly, a bearing plate carried by said support and adapted to be engaged with the rings, said bearing plate having an annular groove receiving the outer end of its spring, and a guide for each of said sliding supports, said guide comprising a plurality of angular guide bars carried by the rings, certain of said guide bars having lugs, fastening means cooperable with said lugs for maintaining said guide rings and said lugs in proper position, said lugs being engageable with the guide posts of the felly for limiting the relative circumferential movement between the felly and said rings.

8. In a wheel of the character described, a hub, spokes carried by said hub, rings carried by said spokes, a felly operating between said rings, coil springs abutting the hub at their inner ends, and a spring seat for the outer end of each of said springs including a support having legs engageable with the felly when the spring of the seat is subjected to load and having a bearing plate receiving the outer end of the spring and engageable with the rings when the spring is not subjected to load.

REUBEN GLADSTONE BRUNER.